United States Patent
Nakata et al.

(10) Patent No.: US 11,892,743 B2
(45) Date of Patent: Feb. 6, 2024

(54) OPTICAL MODULATION ELEMENT AND OPTICAL MODULATION MODULE

(71) Applicant: SUMITOMO OSAKA CEMENT CO., LTD., Tokyo (JP)

(72) Inventors: Yuu Nakata, Tokyo (JP); Norikazu Miyazaki, Tokyo (JP); Satoshi Oikawa, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 272 days.

(21) Appl. No.: 17/599,726

(22) PCT Filed: Sep. 26, 2019

(86) PCT No.: PCT/JP2019/037938
§ 371 (c)(1),
(2) Date: Sep. 29, 2021

(87) PCT Pub. No.: WO2020/202607
PCT Pub. Date: Oct. 8, 2020

(65) Prior Publication Data
US 2022/0197103 A1    Jun. 23, 2022

(30) Foreign Application Priority Data

Mar. 29, 2019   (JP) ................................ 2019-067621

(51) Int. Cl.
*G02F 1/225* (2006.01)
*G02F 1/21* (2006.01)
(Continued)

(52) U.S. Cl.
CPC ........... *G02F 1/2252* (2013.01); *G02B 6/125* (2013.01); *G02B 6/2935* (2013.01); *G02F 1/212* (2021.01)

(58) Field of Classification Search
CPC ........ G02F 1/2252; G02F 1/212; G02F 1/035; G02F 1/01; G02F 1/0102; G02F 1/011;
(Continued)

(56) References Cited

U.S. PATENT DOCUMENTS 10,845,668 B2 * 11/2020 Ogiso ................... G02F 1/2257

FOREIGN PATENT DOCUMENTS

JP      2013-68909    4/2013
JP      2014-112219   6/2014
(Continued)

OTHER PUBLICATIONS

International Search Report dated Dec. 24, 2019, Application No. PCT/JP2019/037938, English translation Included, 4 pages.

*Primary Examiner* — John Bedtelyon
(74) *Attorney, Agent, or Firm* — Rankin, Hill & Clark LLP (57) ABSTRACT

An optical modulation element that can be housed in the same housing together with an electronic circuit is implemented without deteriorating the high-frequency characteristics and the optical modulation characteristics and without increasing a size of the housing. An optical modulation element includes two Mach-Zehnder type optical waveguides that are provided on a substrate, a branched waveguide that branches input light which is input from an outside of the substrate into two light beams, two connection waveguides that respectively guide the light beams branched by the branched waveguide to the two Mach-Zehnder type optical waveguides, and electrodes that respectively control optical waves propagating in optical waveguides configuring the two Mach-Zehnder type optical waveguides, in which respective parallel waveguides of the two Mach-Zehnder type optical waveguides are configured to extend along one side of the substrate, the branched waveguide is (Continued)

disposed such that light is input from a direction of the one side, and the branched waveguide is formed to be line-symmetrical with respect to a propagation direction of the light input to the branched waveguide and to output the two branched light beams in a direction different from the propagation direction.

8 Claims, 8 Drawing Sheets

(51) Int. Cl.
*G02B 6/125* (2006.01)
*G02B 6/293* (2006.01)

(58) Field of Classification Search
CPC ...... G02F 1/0113; G02F 1/0115; G02F 1/025; G02F 1/03; G02F 1/0305; G02F 1/0311; G02F 1/0344; G02F 1/0356; G02F 1/21; G02F 1/225; G02F 1/2255; G02F 1/2257; G02B 6/125; G02B 6/2935
See application file for complete search history.

(56) References Cited

FOREIGN PATENT DOCUMENTS

| | | |
|---|---|---|
| JP | 2014-164243 | 9/2014 |
| JP | 2018-173450 | 11/2018 |

\* cited by examiner

OPTICAL MODULATION ELEMENT AND OPTICAL MODULATION MODULE

TECHNICAL FIELD

The present invention relates to an optical modulator and an optical modulation module.

BACKGROUND ART

In high-speed/large-capacity optical fiber communication systems, optical transmission apparatuses incorporating a waveguide type optical modulator are often used. Above all, an optical modulation element using $LiNbO_3$ (hereinafter, also referred to as LN) having an electro-optic effect for a substrate has low light loss and can realize a wide-band optical modulation characteristic compared with an optical modulation element using a semiconductor-based material such as indium phosphide (InP), silicon (Si), or gallium arsenide (GaAs), and is thus widely used in high-speed/large-capacity optical fiber communication systems.

On the other hand, in a modulation method in an optical fiber communication system, multi-level modulation such as quadrature phase shift keying (QPSK) or dual polarization-quadrature phase shift keying (DP-QPSK) or transmission formats in which polarization multiplexing is incorporated into the multi-level modulation have become the mainstream in response to the recent trend of increasing transmission capacity.

The acceleration of the spread of Internet services in recent years has led to a further increase in communication traffic, and studies on continuous high-speed and large-capacity optical communication systems are still underway. On the other hand, the demand for miniaturization of devices remains unchanged, and, in addition to miniaturization of an optical modulation element, efforts that an electronic circuit and the optical modulation element are housed in one housing and integrated as an optical modulation module are also underway.

For example, an optical modulation module has been proposed in which a high-frequency driver amplifier driving an optical modulation element and the optical modulation element are integrated and house in one housing, and light input and output portions are disposed in parallel on one short side of the housing, and thus the optical modulation module is miniaturized and integrated.

Figure 6:
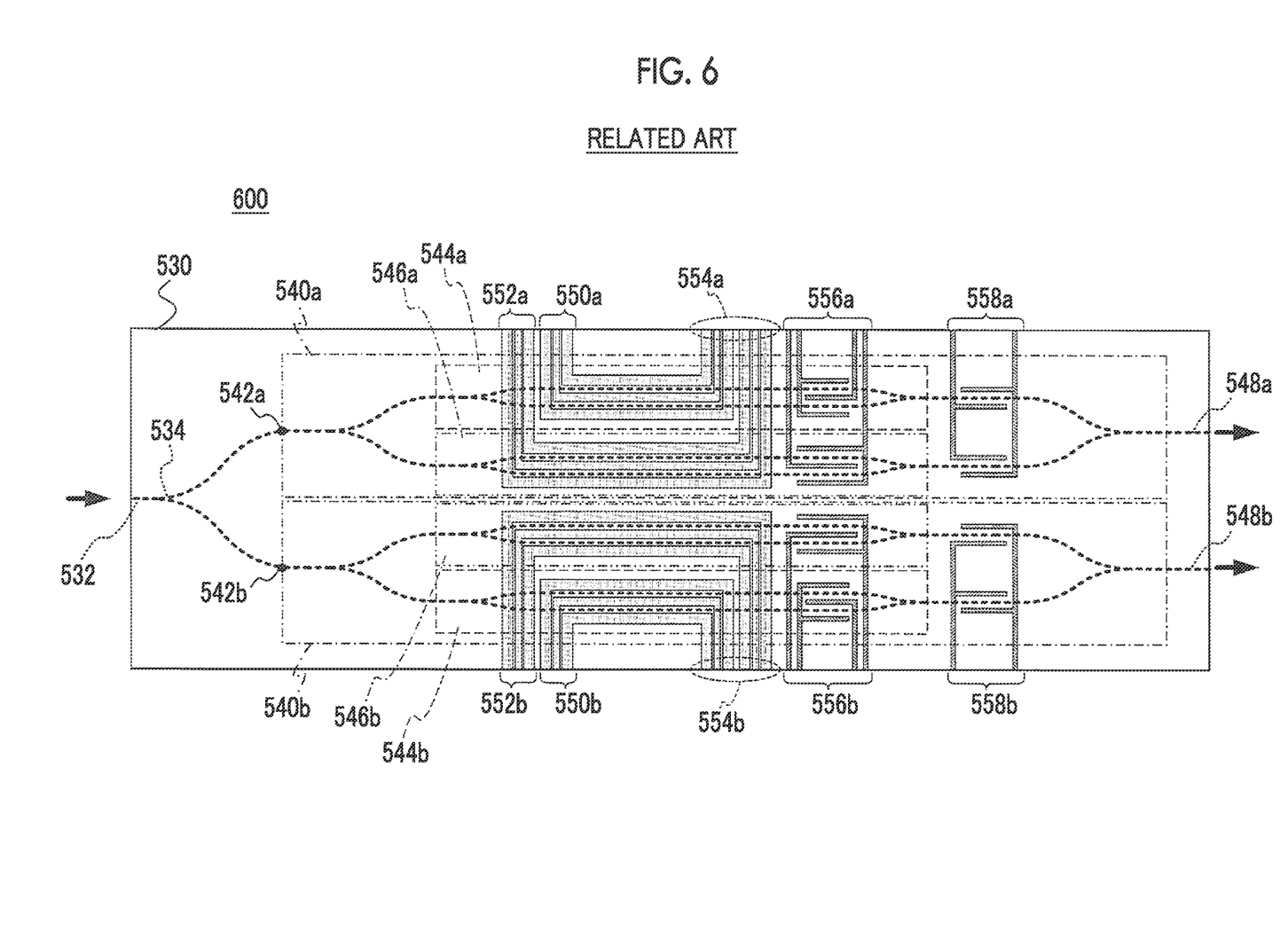
FIG. 6 is a diagram illustrating a configuration of an optical modulation element of the related art that can be used as a single unit.

FIG. 6 is a diagram illustrating an example of a configuration of the related art of an optical modulation element configuring a DP-QPSK modulator used as a single unit before the integration as described above is performed. An optical modulation element 600 configuring a DP-QPSK modulator is configured on a substrate 530 made of LN, and has an input waveguide 532 that receives light input from the left in the figure, and a branched waveguide 534 that branches the light into two light beams having the same amount of the input light. The optical modulation element 600 includes so-called nested Mach-Zehnder type optical waveguides 540*a* and 540*b* (each surrounded by a dot chain line) that are two modulation portions modulating the respective light beams branched by the branched waveguide 534.

The nested Mach-Zehnder type optical waveguides 540*a* and 540*b* respectively include two Mach-Zehnder type optical waveguides 544*a* (a portion inside a dashed line in the figure), 546*a* (a portion inside two-dot chain line in the FIG. 544*b* (a portion inside a dashed line in the figure), and 546*b* (a portion inside two-dot chain line in the figure) provided in two waveguide portions forming a pair of parallel waveguides. Consequently, the nested Mach-Zehnder type optical waveguides 540*a* and 540*b* respectively QPSK-modulate light beams input from modulation light input ends 542*a* and 542*b*, and then output the modulated light beams (output) from respective output waveguides 548*a* and 548*b* to the right in the figure.

These two output light beams are then polarized and combined by optical components disposed outside the substrate 530 and converge into a single light beam that is input to an end of an optical fiber, for example, a lens and is guided into a transmission channel fiber.

Signal electrodes 550*a*, 552*a*, 550*b*, and 552*b* for respectively causing a total of four Mach-Zehnder type optical waveguides 544*a*, 546*a*, 544*b*, and 546*b* configuring the nested Mach-Zehnder type optical waveguides 540*a* and 540*b* to perform modulation operations are provided on the substrate 530. Each of the signal electrodes 550*a*, 552*a*, 550*b*, and 552*b* is formed of, for example, two ground electrodes and one center electrode sandwiched between the two ground electrodes.

Respective ends of the signal electrodes 550*a* and 552*a* are disposed, for example, on the left and right of the upper long side of the substrate 530 in the figure. Respective ends of the signal electrodes 550*b*, 552*b* are disposed, for example, on the left and right of the lower long side of the substrate 530 in the figure. The signal electrodes 550*a* and 552*a*, and 550*b* and 552*b* are terminated by termination resistors (not illustrated) connected to right end arrangements 554*a* and 554*b* in the figure. Consequently, high-frequency electrical signals input from the ends arranged on the left in the figure are changed to traveling waves and propagate through the signal electrodes 550*a*, 552*a*, 550*b*, and 552*b*. This high-frequency electrical signals have a frequency in the microwave region, for example, when the optical modulation element 600 is caused to perform modulation at a transmission rate exceeding 100 Gb/s.

Bias electrodes 556*a*, 558*a*, 556*b*, and 558*b* for adjusting operating points of the nested Mach-Zehnder type optical waveguides 540*a* and 540*b* are also provided on the substrate 530, if necessary.

Although the DP-QPSK modulator of the related art having the above configuration functions well as a single unit, there is room for some improvements in a case of being integrated with the above electronic circuit for higher speed. One of the improvements is that light input and output portions (the input waveguide 532 and the output waveguides 548*a* and 548*b*) are provided at the two opposing short sides on the left and the right of the substrate 530 in the figure, and thus the ends of the signal electrodes 550*a* and 552*a*, and 550*b* and 550*b* are provided at the two upper and lower long sides the substrate 530, respectively, while avoiding these short sides. That is, in order to avoid conflict arrangement, the light input and output portions are disposed at the two short sides, the ends of the signal electrode 550*a* and the like are respectively disposed at the two long sides.

In general, it is desirable that a signal electrode through which a microwave propagates is configured not to include a bent portion or a curved portion as much as possible in order to prevent leakage of microwave energy propagating through the signal electrode into the air as much as possible. In contrast, in the optical modulation element 600 of the related art, in order to avoid a conflict arrangement space with the light input and output portions, the ends of the signal electrodes 550*a* and 552*a*, and 550*b* and 550*b* are provided at the respective long sides of the substrate 530. As a result, the signal electrodes 550*a*, 552*a*, 550*b*, and 550*b* may respectively include bent portions formed by curved line paths or the like before reaching the Mach-Zehnder type optical waveguides 544a, 546a, 544b, and 546b.

Figure 7:
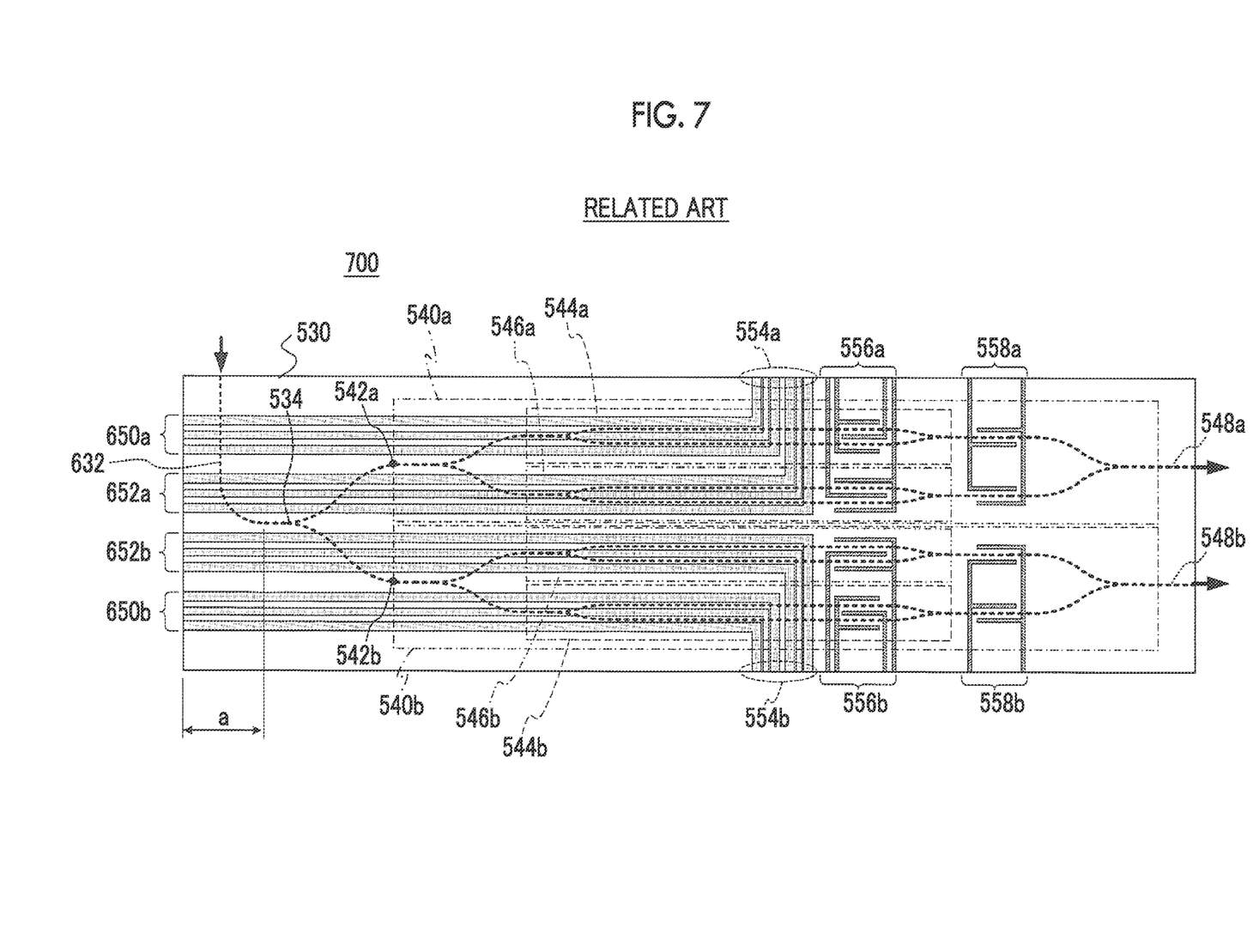
FIG. 7 is a diagram illustrating a first conventional example of an optical modulation element housed in the same housing together with an electronic circuit.

As such a configuration for reducing a bent portion in the signal electrode, in the related art, as in an optical modulation element 700 illustrated in FIG. 7, a configuration has been proposed in which an L-shaped curved input waveguide 632 is provided, and input light is received in a direction orthogonal to an extending direction of optical waveguides of nested Mach-Zehnder type optical waveguides 540a and 540b (Patent Literature No. 1).

Figure 8:
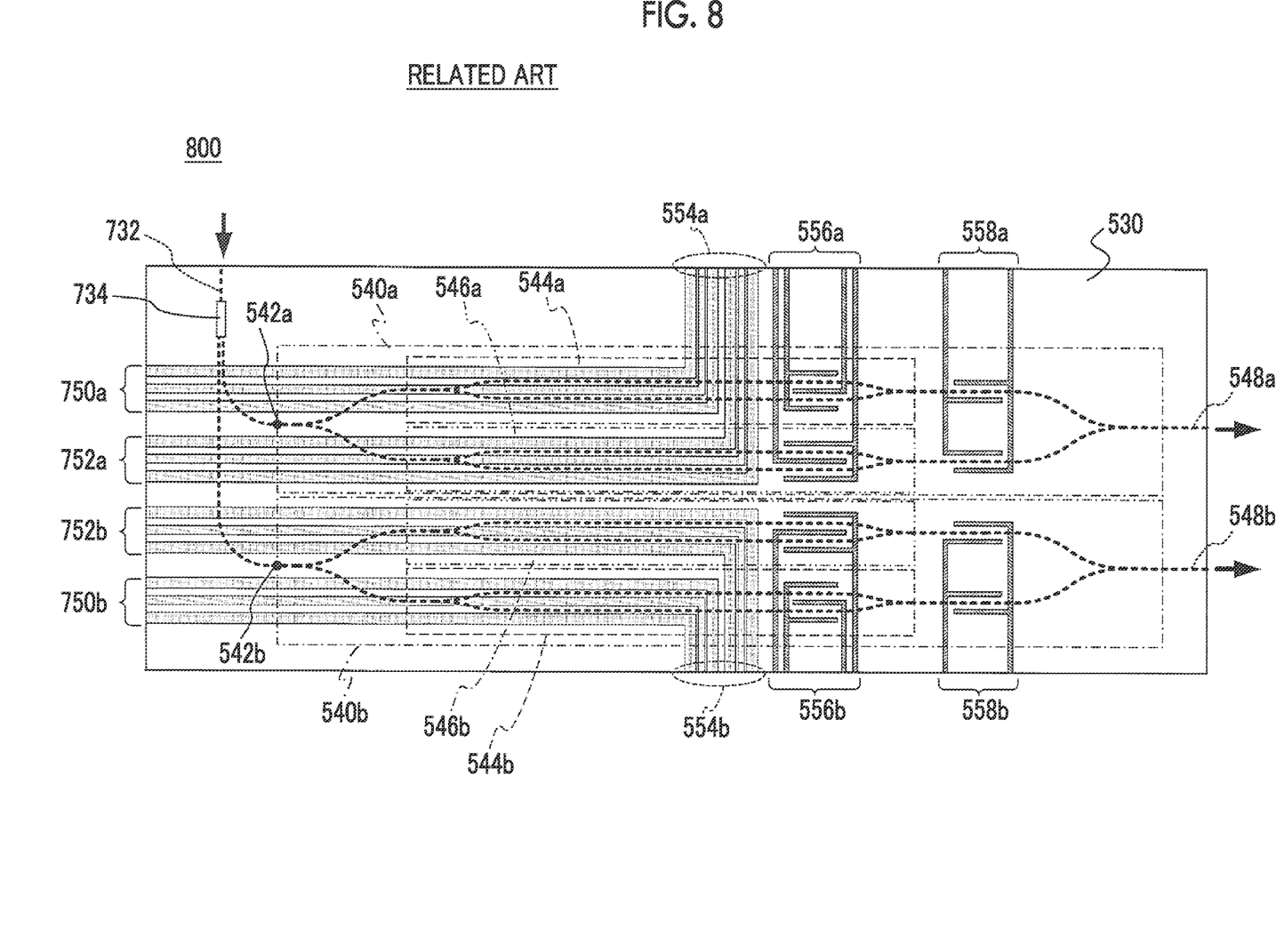
FIG. 8 is a diagram illustrating a second conventional example of an optical modulation element housed in the same housing together with an electronic circuit.

As another configuration, as in an optical modulation element 800 illustrated in FIG. 8, a configuration has been proposed in which, instead of the branched waveguide 534 in FIG. 6, an MMI coupler 734 that branches input light propagating in a direction orthogonal to an extending direction of optical waveguides of nested Mach-Zehnder type optical waveguides 540a and 540b into two light beams and outputs the two branched light beams in a direction that is the same as the propagation direction of the input light is provided (Patent Literature No. 2). In this configuration, the branched light beams exiting the MMI coupler 734 are respectively input to the nested Mach-Zehnder type optical waveguides 540a and 540b via connection waveguides formed of curved waveguides for curving propagation directions of the light beams by 90 degrees.

In FIGS. 7 and 8, the same constituents as those illustrated in FIG. 6 are illustrated using the same reference numerals as those illustrated in FIG. 6.

In the optical modulation elements 700 and 700 illustrated in FIGS. 7 and 8, since input light is input from the long side (each upper side in the figure) of the substrate 530, the signal electrodes 650a, 652a, 650b, and 652b, and the signal electrodes 750a, 752a, 750b, and 750b can be configured linearly along the extending direction of the nested Mach-Zehnder type optical waveguides 540a and 540b without being bent from one short side (each left side in the figure) of the substrate 530 to the nested Mach-Zehnder type optical waveguides 540a and 540b. Therefore, even if a frequency of a high-frequency signal increases due to a high transmission rate, leakage of microwaves from these signal electrodes can be reduced.

However, in the configuration in Patent Literature No. 1 in which an example is illustrated in FIG. 7, since the L-shaped input waveguide 632 is introduced, the substrate 530 has to be lengthened in the length direction over the length a illustrated in the figure. Therefore, this violates the above-described demand for miniaturization of the optical modulation element. Moreover, since the branched waveguide 534 is used without being changed, if a spacing between the nested Mach-Zehnder type optical waveguides 540a and 540b is increased in order to reduce crosstalk between the two nested Mach-Zehnder type optical waveguides 540a and 540b, a length of the connection waveguide from the branched waveguide 534 to each of the nested Mach-Zehnder type optical waveguides 540a and 540b increases, and thus a length of the substrate 530 increases. This is because, in order to increase the spacing while keeping the length of the connection waveguide constant, it is necessary to reduce a radius of curvature of the curved portion provided in the connection waveguide, but the radius of curvature cannot be made infinitely small due to a relationship with a bending loss.

Therefore, in a case where a frequency of a high-frequency electrical signal for driving the nested Mach-Zehnder type optical waveguides 540a and 540b increases due to, for example, an increase in the transmission rate, if the above spacing is increased to reduce crosstalk, the length direction of the substrate 530 will be further expanded, and thus it will be more difficult to meet the above-described demand for miniaturization.

In the configuration in Patent Literature No. 2 in which an example is illustrated in FIG. 8, as described above, the respective branched light beams output from the MMI coupler 734 are input to the nested Mach-Zehnder type optical waveguide 540a and 540b via the connection waveguides including curved waveguides for curving propagation directions of the light beams by 90 degrees. Therefore, in the same manner as described, due to the restriction of the radius of curvature of the curved waveguide portion, it is necessary to secure a certain area or more of the substrate portion in order to form the connection waveguide, and thus it is difficult to miniaturize the substrate 530.

On the other hand, if the branched output light of the MMI coupler 734 is to be output in a direction different from the propagation direction of the input light of the MMI coupler 734, the design of a mode interference portion configuring the MMI coupler 734 becomes complicated, and thus it may be difficult to realize a desired branch ratio (for example, 1:1) accurately.

That is, the above-described optical modulation element of the related art has room for further improvement in an application of housing the optical modulation element in the same housing together with the electronic circuit.

CITATION LIST

Patent Literature

[Patent Literature No. 1] Japanese Laid-open Patent Publication No. 2014-164243
[Patent Literature No. 2] Japanese Laid-open Patent Publication No. 2014-112219

SUMMARY OF INVENTION

Technical Problem

From the above background, it is desired to implement an optical modulation element that can be housed in the same housing together with an electronic circuit without deteriorating high-frequency characteristics and optical modulation characteristics and without increasing a size of the housing.

Solution to Problem

According to an aspect of the present invention, there is provided an optical modulation element including two Mach-Zehnder type optical waveguides that are provided on a substrate; a branched waveguide that branches input light which is input from an outside of the substrate into two light beams; two connection waveguides that respectively guide the light beams branched by the branched waveguide to the two Mach-Zehnder type optical waveguides; and electrodes that respectively control optical waves propagating in optical waveguides configuring the two Mach-Zehnder type optical waveguides, in which respective parallel waveguides of the two Mach-Zehnder type optical waveguides are configured to extend along one side of the substrate, the branched waveguide is disposed such that light is input from a direction of the one side, and the branched waveguide is formed to be line-symmetrical with respect to a propagation direction of the light input to the branched waveguide and to output the two branched light beams in a direction different from the propagation direction.

According to another aspect of the present invention, the branched waveguide is formed of a Y-branch optical waveguide formed to be line-symmetrical with respect to the propagation direction of the light input to the branched waveguide.

According to still another aspect of the present invention, the branched waveguide is formed such that a spacing between the two branched output light beams when exiting a line-symmetrically formed portion is smaller than a spacing between respective light input ends of the two Mach-Zehnder type optical waveguides.

According to still another aspect of the present invention, each of the electrodes is formed to extend along a direction in which the two Mach-Zehnder type optical waveguides extend to an other side of the substrate different from the one side.

According to still another aspect of the present invention, the two Mach-Zehnder type optical waveguides are nested Mach-Zehnder type optical waveguides that respectively include different Mach-Zehnder type optical waveguides in two parallel waveguides respectively configuring the Mach-Zehnder type optical waveguides.

According to still another aspect of the present invention, the two connection waveguides each includes a linear waveguide and a curved waveguide, and are configured such that total propagation losses from a light input portion of the branched waveguide to respective light input ends of the two Mach-Zehnder type optical waveguides are the same as each other.

According to still another aspect of the present invention, the two connection waveguides are configured such that optical path lengths from a light input portion of the branched waveguide to respective light input ends of the two Mach-Zehnder type optical waveguides are the same as each other.

According to still another aspect of the present invention, the substrate has a rectangular shape having two opposing short sides and two opposing long sides longer than the short sides, the one side is one of the long sides, and the propagation direction of the light when the light is input to the branched waveguide is a direction along the short sides.

Another still aspect of the present invention, there is provided an optical modulation module including one of the above optical modulation elements; an electronic circuit that drives the optical modulation element; and a housing that houses the optical modulation element and the electronic circuit.

It should be noted that this specification includes all the content of the Japanese Patent Application No. 2019-067621 filed on Mar. 29, 2019.

Advantageous Effects of Invention

According to the present invention, it is possible to implement an optical modulation element that can be housed in the same housing together with an electronic circuit without deteriorating high-frequency characteristics and optical modulation characteristics and without increasing a housing size.

DESCRIPTION OF EMBODIMENTS

Figure 1:
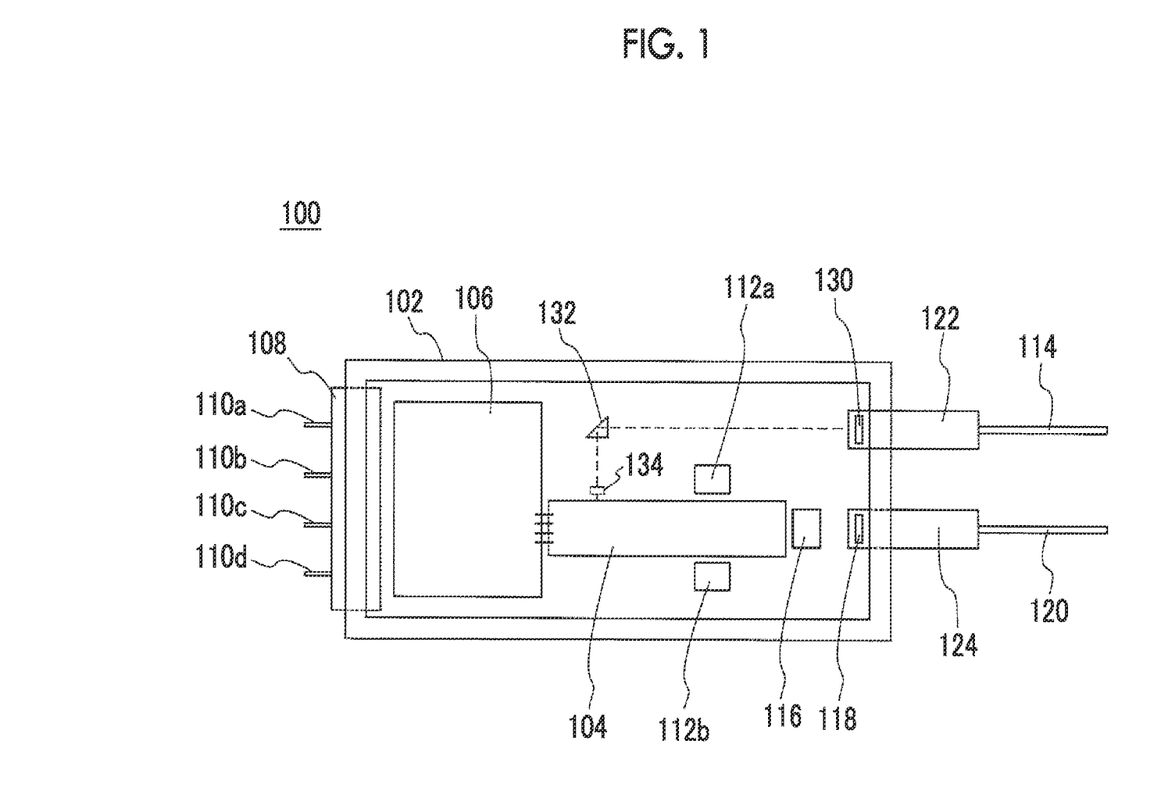
FIG. 1 is a diagram illustrating a configuration of an optical modulation module according to a first embodiment of the present invention.

Hereinafter, embodiments of the present invention will be described with reference to the drawings. FIG. 1 is a diagram illustrating a configuration of an optical modulation module 100 according to a first embodiment of the present invention. The optical modulation module 100 includes a housing 102, an optical modulation element 104 housed in the housing 102, and an electronic circuit 106 that drives the optical modulation element 104. The optical modulation element 104 is, for example, a DP-QPSK modulator. The optical modulation element 104 has, for example, a rectangular shape having a pair of short sides and a pair of long sides longer than the short sides. A cover (not illustrated) which is a plate body is finally fixed to an opening of the housing 102, and the inside of the housing 102 is airtightly sealed.

The optical modulation module 100 also has signal pins 110*a*, 110*b*, 110*c*, and 110*d* for inputting electrical signals used for modulation in the optical modulation element 104, and a feed-through portion 108 for introducing these signal pins 110*a*, 110*b*, 110*c*, and 110*d* into the housing 102. In the present embodiment, four electrical signals for respectively driving four Mach-Zehnder modulators configuring two nested Mach-Zehnder modulators included in the optical modulation element 104 are input from the four signal pins 110*a*, 110*b*, 110*c*, and 110*d*.

The optical modulation module 100 further includes an input optical fiber 114 for inputting light into housing 102, and an output optical fiber 120 for guiding light modulated by the optical modulation element 104 to the outside of the housing 102.

Here, the input optical fiber 114 and the output optical fiber 120 are fixed to the housing 102 via supports 122 and 124 that are fixing members, respectively. Light input from the input optical fiber 114 is collimated by a lens 130 disposed within the support 122 and is input to the optical modulation element 104 from one long side (the upper long side in the figure) of the optical modulation element 104 via a prism 132 and a lens 134. However, this is only an example, and the input of light to the optical modulation element 104 may be performed, for example, by introducing the input optical fiber 114 into the housing 102 via the support 122 and disposing an end of the input optical fiber 114 at one long side of the optical modulation element 104.

The optical modulation module 100 also has an optical unit 116 that polarizes and combines two modulated light beams output from the optical modulation element 104. The light that has been polarized and combined and output from the optical unit 116 is collected by a lens 118 disposed in the support 124 extending to the inside of the housing 102 and coupled to the output optical fiber 120.

A high-frequency electrical signal for driving the optical modulation element 104 output from the electronic circuit 106 is connected to one end of a signal electrode (that will be described later) of the optical modulation element 104 directly from a substrate of the electronic circuit 106 through, for example, wire bonding or indirectly via a relay substrate. The optical modulation module 100 includes two terminators 112a and 112b having predetermined impedances in the housing 102.

Figure 2:
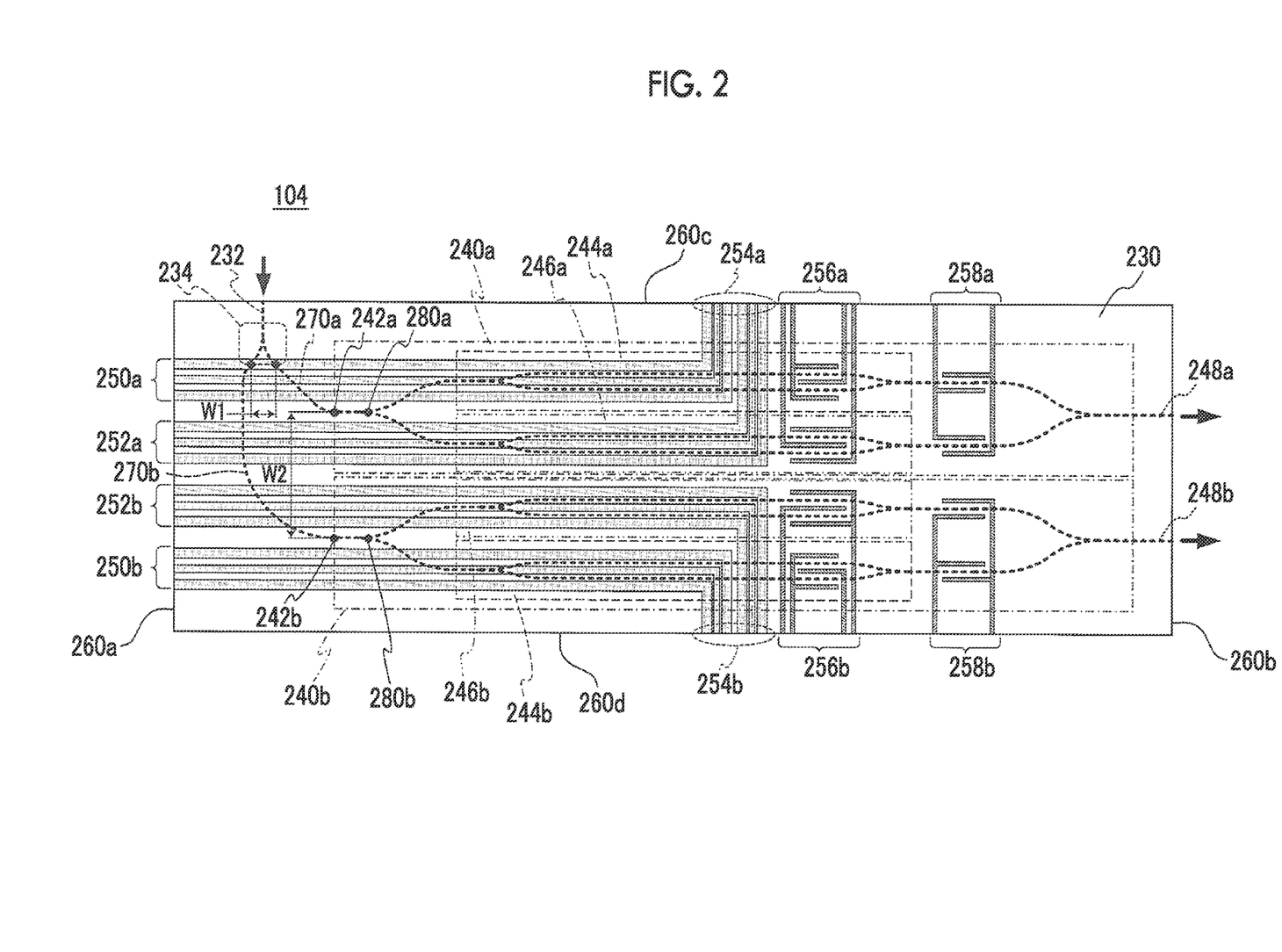
FIG. 2 is a diagram illustrating a configuration of an optical modulation element used in the optical modulation module illustrated in FIG. 1.

FIG. 2 is a diagram illustrating an example of a configuration of the optical modulation element 104 housed in the housing 102 of the optical modulation module 100 illustrated in FIG. 1. The optical modulation element 104 is, for example, a waveguide type optical element that performs DP-QPSK modulation, and is configured with, for example, optical waveguides (a thick dotted line in the figure) formed on a substrate 230 made of LN. These optical waveguides may be formed by thermally diffusing Ti on the surface of the substrate 230, but this is only an example. These optical waveguides may be, for example, rib-type optical waveguides in which the substrate 230 is processed into a thin plate with a thickness of several microns, and a line portion in which an optical waveguide is formed is thicker than other portions such that an effective refractive index of the line portion is higher than that of the other portions.

The substrate 230 is, for example, rectangular, and has two short sides 260a and 260b extending in a vertical direction and opposite to each other, and two long sides 260c and 260d extending in a horizontal direction orthogonal to the short sides 260a and 260b in the figure, longer than the short sides 260a and 260b, and opposite to each other. For example, in the substrate 230, the short sides 260a and 260b are opposite to each other in parallel, the long sides 260c and 260d are opposite to each other in parallel, and the extending direction of the short sides 260a and 260b are orthogonal to the extending direction of the long sides 260c and 260d.

The optical modulation element 104 has two nested Mach-Zehnder type optical waveguides 240a and 240b (each portion is surrounded by a dot chain line in the figure) each of which performs a QPSK modulation operation. These nested Mach-Zehnder type optical waveguides 240a and 240b respectively include two Mach-Zehnder type optical waveguides 244a (inside a rectangular shape indicated by a dashed line in the figure) and 246b (inside a rectangular shape indicated by a two-dot chain line in the figure), and 244b (inside a rectangular shape indicated by a dashed line in the figure) and 246b (inside a rectangular shape indicated by a two-dot chain line in the figure) respectively provided in two waveguide portions forming a pair of parallel waveguide. Consequently, the nested Mach-Zehnder type optical waveguides 240a and 240b QPSK-modulate light beams input from modulation light input ends 242a and 242b, respectively, and output the modulated light beams (output) from respective output waveguides 248a and 248b.

In the present embodiment, the four Mach-Zehnder type optical waveguides 244a, 246b, 244b and 246b configuring the nested Mach-Zehnder type optical waveguides 240a and 240b are parallel to each other (thus, respective parallel waveguides such as these Mach-Zehnder type optical waveguides 244a, 246b, 244b and 246b) are configured to extend along one side of the substrate 230, for example, the long side 260c or 260d.

Signal electrodes 250a, 252a, 250b, and 252b for respectively causing a total of four Mach-Zehnder type optical waveguides 244a, 246a, 244b, and 246b configuring the nested Mach-Zehnder type optical waveguides 240a and 240b to perform modulation operations are provided on the substrate 230. Each of the signal electrodes 250a, 252a, 250b, and 252b is formed of, for example, two ground electrodes and one center electrode sandwiched between the two ground electrodes.

Each of the signal electrodes 250a, 252a, 250b, and 252b is formed to extend up to, for example, the short side 260a that is another side of the substrate 230 different from the long side 260c or 260d that is the one side along the direction in which the two nested Mach-Zehnder type optical waveguides 240a and 240b extend.

In other words, in the present embodiment, the signal electrodes 250a, 252a, 250b, 252b linearly extend from the short side 260a on the left side in the figure to the Mach-Zehnder type optical waveguides 244a, 246a, 244b, and 246b configuring the nested Mach-Zehnder type optical waveguides 240a and 240b along the extending direction of the nested Mach-Zehnder type optical waveguide 240a and 240b (thus, along the extending direction of the long sides 260c and 260d). The signal electrodes 250a, 252a, 250b, and 252b are respectively connected to signal output electrodes of the electronic circuit 106 at the ends disposed at the short side 260a. Consequently, in the optical modulation element 104, four high-frequency electrical signals input from the electronic circuit 106 on the short side 260a propagate to the four Mach-Zehnder type optical waveguides 244a, 246a, 244b, and 246b without changing propagation directions of the high-frequency electrical signals. As a result, in the optical modulation element 104, leakage of the high-frequency electrical signals input from the electronic circuit 106 is suppressed, and thus the optical modulation element 104 can be housed in the same housing 102 together with the electronic circuit 106 without deteriorating the high-frequency characteristics.

The signal electrodes 250a and 252a are formed to be curved toward the long side 260c after extending along the extending direction of the nested Mach-Zehnder type optical waveguide 240a. The signal electrodes 250a and 252a are connected to a terminator 112a in an end arrangement 254a on the long side 260c. The signal electrodes 250b and 252b are formed to be curved toward the long side 260d after extending along the extending direction of the nested Mach-Zehnder type optical waveguide 240b. The signal electrodes 250b and 252b are connected to a terminator 112b in an end arrangement 254b on the long side 260d. Consequently, the four high-frequency electrical signals input from the electronic circuit 106 at the short side 260a respectively propagate as traveling waves in the signal electrodes 250a, 252a, 250b, and 252b.

The optical modulation element 104 is further provided with bias electrode 256a, 258a, 256b, and 258b for adjusting operating points of the nested Mach-Zehnder type optical waveguides 240a and 240b on the substrate 230, if necessary.

The input light to the optical modulation element 104 is input from the input optical fiber 114 connected to the long side 260c of the substrate 230.

In particular, the optical modulation element 104 of the present embodiment does not have a branched waveguide to which light is input along the extending direction of the nested Mach-Zehnder type optical waveguides 540a and 540b, such as the branched waveguide 534 in the optical modulation element 700 of the related art illustrated in FIG. 7.

Instead, the optical modulation element 104 includes a branched waveguide 234 disposed such that light is input from a direction of the long side 260c that the is one side of the substrate 230. The branched waveguide 234 is formed of Y-branch optical waveguides to be line-symmetrical with respect to the propagation direction of light input to the branched waveguide 234 and to output two branched light beams in a direction different from the propagation direction. Here, in the present embodiment, the branched waveguide 234 is arranged so that the propagation direction of the light input to the branched waveguide 234 from a direction of the long side 260c is along the short side 260a. There is.

The two branched outputs that are output from the branched waveguide 234 are, respectively guided and connected to the modulation light input ends 242a and 242b of the nested Mach-Zehnder type optical waveguide 240a and 240b via the connection waveguides 270a and 270b.

Here, in the present embodiment, the branched waveguide 234 is formed such that a spacing W1 between two branched output light beams when exiting a portion formed in line symmetry (the portion surrounded by a rectangular dashed line indicating the branched waveguide 234 in FIG. 2) is smaller than a spacing W2 between the modulation light input ends 242a and 242b that are respective light input ends of the two nested Mach-Zehnder type optical waveguides 240a and 240b (that is, W1<W2). In addition to the positions illustrated in FIG. 2, the modulation light input ends 242a and 242b may also be defined as positions of branch points 280a and 280b of the two branched waveguides configuring the respective input portions of the nested Mach-Zehnder type optical waveguides 240a and 240b. In this case, the spacing W2 is defined as a distance between the two branch points 280a and 280b.

In the present embodiment, the connection waveguides 270a and 270b are formed of a linear waveguide and a curved waveguide as illustrated in FIG. 2. The connection waveguides 270a and 270b are configured such that total propagation losses from the light input portion of the branched waveguide 234 to the modulation light input ends 242a and 242b of the two nested Mach-Zehnder type optical waveguides 240a and 240b are the same as each other. Consequently, for example, even if a branch ratio of the branched waveguide 234 has a deviation from 1:1 in design, the deviation can be corrected by a bending loss or the like in the curved waveguide portions of the connection waveguides 270a and 270b, and thus the degree of freedom in design is improved.

As described above, the optical modulation element 104 having the above configuration does not use a branched waveguide in which light is input along the extending direction of the nested Mach-Zehnder type optical waveguides 240a and 240b, such as the branched waveguide 534 in FIG. 6, and thus is not required to use the L-shaped curved input waveguide 632 illustrated in FIG. 7, and an increase in a size increases in the horizontal direction in the figure as illustrated in FIG. 7 (an increase in the length indicated by "a" in the figure) does not occur.

Further, unlike the MMI coupler 734 in the optical modulation element 800 of the related art illustrated in FIG. 8, even if the Y-branch waveguides configuring the branched waveguide 234 are formed such that two branched light beams branched with respect to propagation direction of input light are output in different directions, the Y-branch waveguides can be easily configured such that the input light is accurately and evenly distributed (that is, a branch ratio of 1:1 can be easily realized). Thus, amounts of light beams input to the two nested Mach-Zehnder type optical waveguides 240a and 240b can be made the same, and the occurrence of distortion in a modulated waveform can be easily suppressed.

The Y-branch waveguides configuring the branched waveguide 234 may be configured to be line-symmetrical with respect to a line segment in the propagation direction of the input light in order to secure the branch ratio of 1:1, and as described above, two branched output light beams are not necessarily required to be output in the same direction as a direction of the input light. Thus, in the branched waveguide 234, as long as the above-described line-symmetrical shape is maintained, an output direction of one of the branched outputs may be designed to be directed toward the nested Mach-Zehnder type optical waveguide 240a closer to the branched waveguide 234. Therefore, compared with a case of using the branched waveguide that outputs branched output light in the same direction as that of input light as in the MMI coupler 734 illustrated in FIG. 8, it is not necessary to change a direction of light by 90 degrees, and there is no inflection point in a change in the propagation direction of light in a path from the input to the branched waveguide 234 to the modulation light input end 242a via the connection waveguide 270a (that is, in the configuration of FIG. 2, the propagation direction of light in the above path always changes in one direction (counterclockwise), and does not change in the opposite direction (clockwise) in the middle). Therefore, in the optical modulation element 104, the connection waveguide 270a reaching the modulation light input end 242a of the closer nested Mach-Zehnder type optical waveguide 240a can be formed shorter while having a larger radius of curvature.

On the other hand, in the branched waveguides 234, the output direction of the other branch output is directed to be away from the farther nested Mach-Zehnder type optical waveguide 240b in terms of the symmetry of the branch points of the branched waveguide 234. However, the connection waveguide 270b reaching the modulation light input end 242b of the farther nested Mach-Zehnder type optical waveguide 240b can be configured to be longer than the connection waveguide 270a, and can thus be freely and easily designed within the restriction of a bending loss of the optical waveguide (that is, the restriction of a radius of curvature).

The branched output light beams that are output from the branched waveguide 234 are connected to the modulation light input ends 242a and 242b of the nested Mach-Zehnder type optical waveguides 240a and 240b via the connection waveguides 270a and 270b as described above. Thus, for example, in a case where it is desired to increase the spacing W2 between the nested Mach-Zehnder type optical waveguides 240a and 240b in order to improve crosstalk, it is only necessary to adjust an extending distance of the connection waveguides 270a and 270b along the short side 260a, and it is not necessary to increase the spacing W1 between the branched output light beams in the branched waveguide 234. Therefore, unlike the optical modulation element 700 of the related art illustrated in FIG. 7, in the optical modulation element 104, even if the spacing between the nested Mach-Zehnder type optical waveguides 240a and 240b is increased, it is not necessary to increase a length of the substrate 230 in a length direction (that is, a direction along the long sides 260c and 260d).

From the above description, the optical modulation element 104 can be housed in the same housing 102 together with the electronic circuit 106 without deteriorating the high-frequency characteristics and the optical modulation characteristics and without increasing a size of the optical modulation element 104 (thus, without increasing a size of the housing 102).

Next, a modification example of the optical modulation element 104 that can be used in the optical modulation module 100 according to the first embodiment will be described.

First Modification Example

Figure 3:
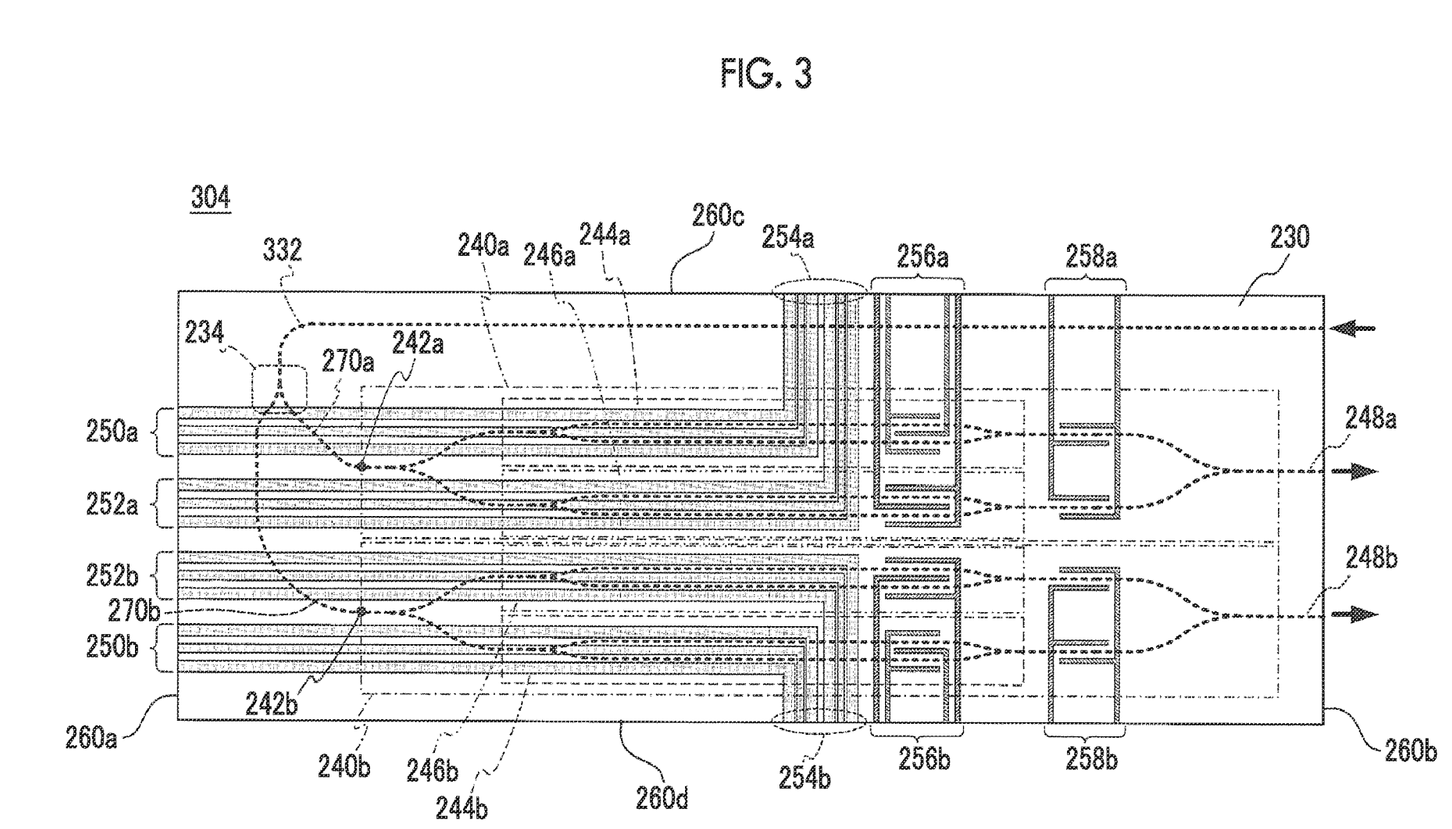
FIG. 3 is a diagram illustrating a first modification example of the optical modulation element that can be used in an optical modulator illustrated in FIG. 1.

FIG. 3 is a diagram illustrating a configuration of an optical modulation element 304 according to a first modification example. In FIG. 3, the same constituents as those of the optical modulation element 104 illustrated in FIG. 2 are given the same reference numerals as those in FIG. 2, and the above description of FIG. 2 is incorporated.

The optical modulation element 304 illustrated in FIG. 3 has the same configuration as that of the optical modulation element 104 except that an input waveguide 332 is provided instead of the input waveguide 232. Whereas the input waveguide 232 of the optical modulation device 104 guides input light that is input from the long side 260c to the branched waveguide 234 without changing the propagation direction of the light, the input waveguide 332 of the optical modulation element 304 of the present modification example causes input light that is input from the short side 260b to propagate along the long side 260c, then changes a propagation direction of the light by 90 degrees, and connects the input light to the branched waveguide 234. That is, the branched waveguide 234 is configured to receive light from a direction of the long side 260c while receiving input light from the short side 260b.

In the optical modulation element 304 having the above configuration, in a case where the optical modulation element 304 is housed in the housing 102 of the optical modulation module 100 and used, unlike a case where the optical modulation element 104 is used, the input optical fiber 114 inside the housing 102 is not required to be curved by 90 degrees toward the long side 260c. Therefore, in a case where the optical modulation element 304 is used, a space for routing the input optical fiber 114 in the housing 102 becomes unnecessary. For example, the shape of the electronic circuit 106 can be changed, and thus a size of the housing 102 in the width direction (the vertical direction in the figure) can be further reduced, for example, by changing a shape of the electronic circuit 106 without changing an area.

Second Modification Example

Figure 4:
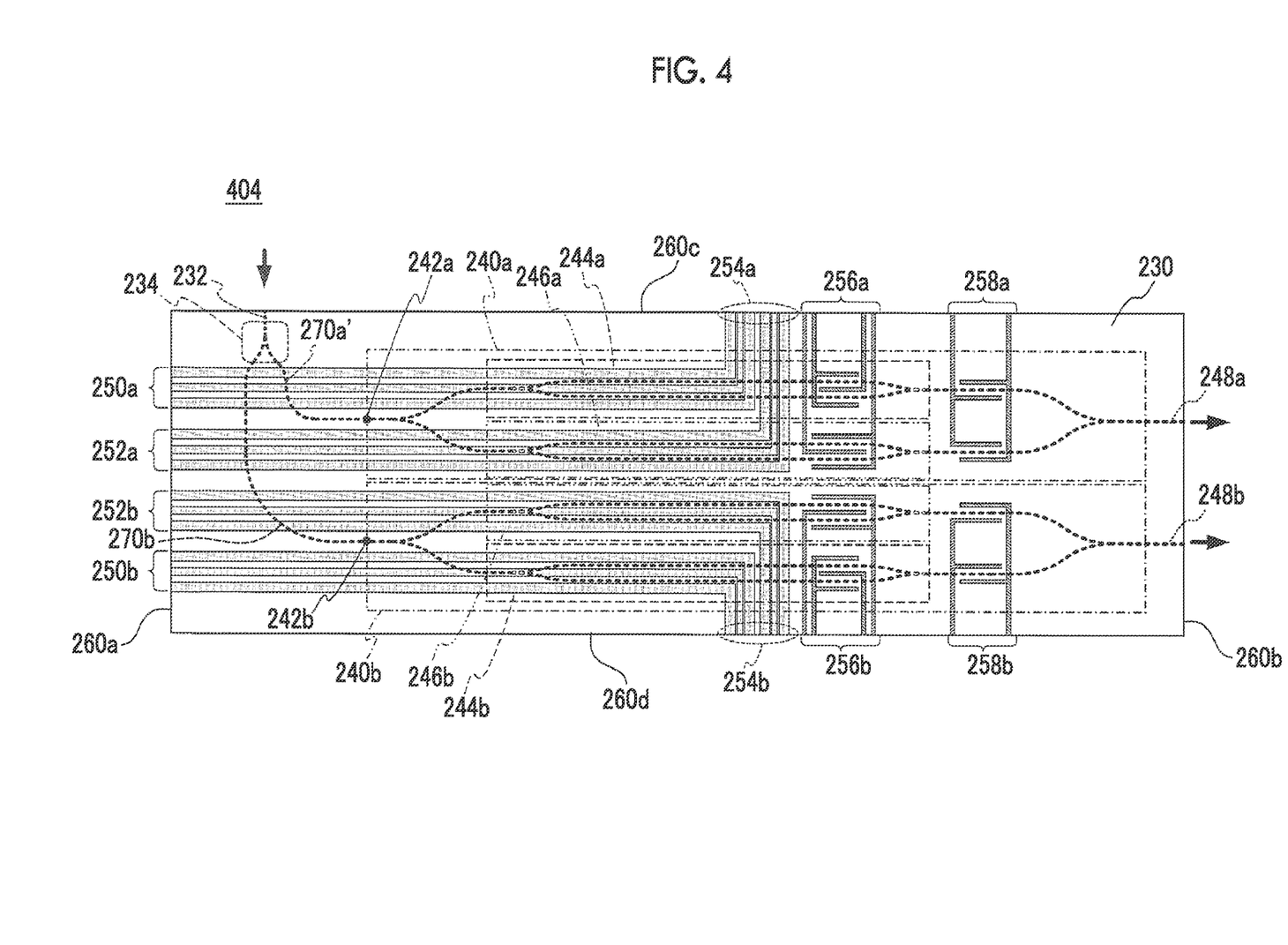
FIG. 4 is a diagram illustrating a second modification example of the optical modulation element that can be used in the optical modulator illustrated in FIG. 1.

FIG. 4 is a diagram illustrating a configuration of an optical modulation element 404 according to a second modification example. In FIG. 4, the same constituents as those of the optical modulation element 104 illustrated in FIG. 2 are given the same reference numerals as those in FIG. 2, and the above description of FIG. 2 is incorporated.

The optical modulation element 404 illustrated in FIG. 4 has the same configuration as that of the optical modulation element 104 except that a connection waveguide 270a' is provided instead of the connection waveguide 270a. The connection waveguide 270a' has the same configuration as that of the connection waveguide 270a, but is different in that light output from the branched waveguide 234 temporarily propagates in the same propagation direction as that of input light of the branched waveguide 234 and is then guided to the modulation light input end 242a.

In the configuration in FIG. 4, as illustrated in FIGS. 2 and 3, unlike the configuration in which the connection waveguide 270a is formed toward the modulation light input end 242a of the Mach-Zehnder type optical waveguide 240a immediately after being branched from the branched waveguide 234, the connection waveguide 270a' includes linear waveguide portions provided in parallel with a narrow spacing with respect to linear waveguide portions of the connection waveguide 270b. As a result, in the configuration in FIG. 4, waveguides after being branched can be connected to a plurality of Mach-Zehnder type optical waveguides 240a and 240b while suppressing a size of the substrate 230 in the length direction (the horizontal direction in the figure), and thus the degree of freedom in disposition of the plurality of Mach-Zehnder type optical waveguides 240a and 240b can be increased.

Third Modification Example

Figure 5:
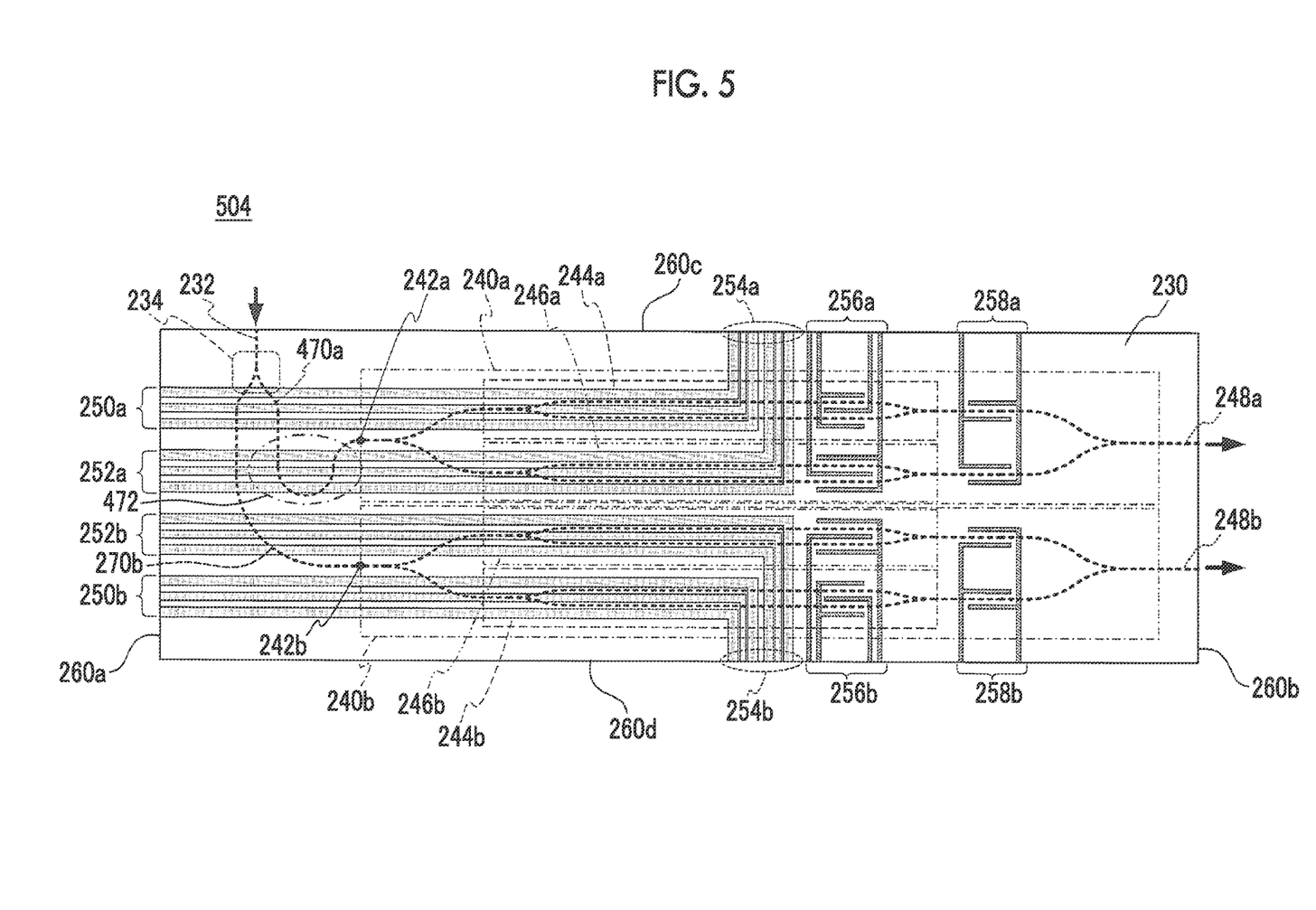
FIG. 5 is a diagram illustrating a third modification example of an optical modulation element that can be used in the optical modulator illustrated in FIG. 1.

FIG. 5 is a diagram illustrating a configuration of an optical modulation element 504 according to a third modification example. In FIG. 5, the same constituents as those of the optical modulation element 104 illustrated in FIG. 2 are given the same reference numerals as those in FIG. 2, and the above description of FIG. 2 is incorporated.

The optical modulation element 504 illustrated in FIG. 5 has the same configuration as that of the optical modulation element 104 except that a connection waveguide 470a is provided instead of the connection waveguide 270a. The connection waveguide 470a has the same configuration as that of the connection waveguide 270a except that a meandering portion 472 is included in the middle of the connection waveguide 470a. As a result, the connection waveguides 470a and 270b are configured such that respective optical path lengths from the light input portion of the branched waveguide 234 to the modulation light input ends 242a and 242b that are light input ends of the two nested Mach-Zehnder type optical waveguides 240a and 240b are the same as each other.

Since the optical modulation element 504 having the above configuration is configured such that the optical path lengths from the end of the long side 260c of the input waveguide 232 to the modulation light input ends 242a and 242b are the same as each other, for example, this is suitable for a case where it is desired that phases of light beams that are input to the two nested Mach-Zehnder type optical waveguides 240a and 240b are the same at the modulation light input ends 242a and 242b.

The present invention is not limited to the configurations of the above-described embodiment and modification examples thereof, and can be implemented in various aspects without departing from the concept thereof.

For example, in the present embodiment, the substrate 230 has, for example, two short sides 260a and 260b opposite to each other in parallel and two long sides 260c and 260d opposite to each other in parallel, and has a rectangular shape in which the extending direction of the short sides 260a and 260b and the extending direction of the long sides 260c and 260d are orthogonal to each other, but the present invention is not limited to this. The nested Mach-Zehnder type optical waveguides 240a and 240b extend along the long side 260c or 260d that is one side, and the branched waveguide 234 extends along the extending direction of the short side 260a that is the other side and is disposed such that light is input from a direction of the long side 260c, but the present invention is not limited to this.

The short sides 260a and 260b of the substrate 230 may not be parallel to each other, or the long sides 260c and 260d may not be parallel to each other. In the nested Mach-Zehnder type optical waveguides 240a and 240b that are two Mach-Zehnder type optical waveguides connected to the branched waveguide 234, at least each of the parallel waveguides may extend along one side of the substrate 230, and the branched waveguide 234 may be disposed such that light is input from a direction of the one side.

In the above-described embodiment and modification example thereof, the optical modulation elements 104, 304, and 404 are provided with two nested Mach-Zehnder type optical waveguides 240a and 240b each of which performs QPSK modulation and perform DP-QPSK modulation, but the present invention is not limited to this. For example, instead of the nested Mach-Zehnder type optical waveguides 240a and 240b, two Mach-Zehnder type optical waveguides that perform normal amplitude modulation may be provided, receive light from one light source via the input waveguide 232, modulate the light with different high-frequency electrical signals, and output the light to two output optical fibers.

Even in this case, the same configuration as the configuration using the branched waveguide 234 in the above-described optical modulation elements 104, 304, and 404 is used, and thus the optical modulation element and the electronic circuit can be housed together in the same housing without deteriorating the high-frequency characteristics and the optical modulation characteristics and without increasing a size of the optical modulation element (thus, without increasing a housing size).

In the above-described embodiment and modification examples thereof, the ground electrodes configuring the signal electrodes 250a, 252a, 250b, and 252b are provided separately from each other, but the present invention is not limited to this. Among the signal electrodes 250a, 252a, 250b, and 252b, two adjacent ground electrodes of adjacent signal electrodes may be formed as one continuous ground electrode by forming a conductor therebetween. For example, in FIG. 2, the ground electrode on the lower side of the signal electrode 250a in the figure may extend to the lower side in the figure to be integrated with the ground electrode on the upper side of the signal electrode 252a in the figure and to form one ground electrode. The same applies to the ground electrode on the lower side of the signal electrode 252a in the figure and the ground electrode on the upper side of the signal electrode 252b in the figure, and the ground electrode on the lower side of the signal electrode 252b in the figure and the ground electrode on the upper side of the signal electrode 250b in the figure.

As described above, the optical modulation element 104, 304, 404, or 504 described in the present embodiment includes the nested Mach-Zehnder type optical waveguides 240a and 240b that are two Mach-Zehnder type optical waveguides provided on the substrate 230, and the branched waveguide 234 that branches input light that is input from the outside of the substrate 230 into two light beams. The optical modulation element 104, 304, 404, or 504 also has the two connection waveguides 270a and 270b that respectively guide the light beams branched by the branched waveguide 234 to the two nested Mach-Zehnder type optical waveguides 240a and 240b, and the signal electrodes 250a, 252a, 250b, and 252b that are electrodes for respectively controlling optical waves propagating in the optical waveguides configuring the two nested Mach-Zehnder type optical waveguides. Each of the optical waveguides configuring the two nested Mach-Zehnder type optical waveguides 240a and 240b is configured to extend to the long side 260c that is one side of the substrate 230. The branched waveguide 234 is disposed such that light is input from a direction of the long side 260c that is the one side (for example, along the extending direction of the short side 260a). The branched waveguide 234 is formed to be line-symmetrical with respect to a propagation direction of the light input to the branched waveguide 234 and to output the two branched light beams in a direction different from the propagation direction.

According to this configuration, the branched waveguide 234 is disposed such that light is input from a direction of one side (long side 260c) along the direction in which the nested Mach-Zehnder type optical waveguides 240a and 240b extend. Therefore, even in a case where the signal electrodes 250a, 252a, 250b, and 252b extend along the extending direction, light can be input from a direction different from a direction of the ends of these signal electrodes 250a, 252a, 250b, and 252b to the substrate 230. Therefore, the optical modulation elements 104, 304, 404, and 504, while avoiding conflicts between an input position of light to the substrate 230 and input positions of high-frequency electrical signals, the signal electrodes 250a, 252a, 250b, and 252b can be formed linearly along the extending direction of the nested Mach-Zehnder type optical waveguides 240a and 240b from the input positions of the high-frequency electrical signals, and thus favorable high-frequency characteristics can be obtained.

In particular, in the above configuration, as described above, the branched waveguide 234 is disposed such that light is input from a direction of one side (long side 260c) along the direction in which the two nested Mach-Zehnder type optical waveguides 240a and 240b extend. Therefore, unlike the configuration described in Patent Literature No. 1, even in a case where a spacing between the two nested Mach-Zehnder type optical waveguides 240a and 240b is increased, it is not necessary to widen the substrate 230 in the extending direction. Therefore, favorable optical characteristics can be obtained by reducing crosstalk between the two nested Mach-Zehnder type optical waveguides 240a and 240b without increasing a size of the substrate 230.

In particular, according to the above configuration, the branched waveguide 234 is formed to be symmetrical with respect to the propagation direction of input light and to output two branched light beams in a direction different from the propagation direction. Therefore, it is not necessary to significantly change the light propagation direction (for example, up to 90 degrees) from the branched waveguide 234 toward the nested Mach-Zehnder type optical waveguide 240a closer to the branched waveguide 234. Therefore, in the optical modulation elements 104 and 404, compared with the configuration in Patent Literature No. 2 using the MMI coupler that outputs branched light in the same direction as that of input light, a size of a curved waveguide portion of the connection waveguide 270a reaching the nested Mach-Zehnder type optical waveguide 240a from the branched waveguide 234 can be reduced, and thus a size of the substrate 230 can be reduced.

As a result of these effects, the optical modulation element 104 or 404 can be housed in the housing 102 together with the electronic circuit 106 without deteriorating the high-frequency characteristics and the optical modulation characteristics and without increasing the size of the housing 102.

In the optical modulation elements 104, 304, 404, and 504, the branched waveguide 234 is formed of Y-branch optical waveguides formed to be line-symmetrical with respect to the propagation direction of the light input to the branched waveguide 234. According to this configuration, for example, the line-symmetrical branched waveguide 234 that can accurately realize a branch ratio of 1:1 can be easily formed.

In the optical modulation elements 104, 304, 404, and 504, in the branched waveguide 234, the spacing W1 between the two branched output light beams when exiting the portion formed in line symmetry is smaller than the spacing W2 between the respective light input ends of the two nested Mach-Zehnder type optical waveguides 240a and 240b.

According to this configuration, it is not necessary to increase the size of the substrate 230, for example, even in a case where the spacing between the two nested Mach-Zehnder type optical waveguides 240a and 240b is increased. Therefore, the optical modulation elements 104, 304, 404, and 504 can be compactly configured while effectively reducing the crosstalk between the two nested Mach-Zehnder type optical waveguides 240a and 240b.

In order to maintain the branch ratio in the branched waveguide 234, it is necessary to maintain the symmetry of the branched waveguide 234 up to a point that the influence of the two branched output light beams is allowed (more than twice the light intensity distribution of the optical wave propagating in the branched waveguide). Therefore, it is more desirable that the spacing W1 between the two branched output light beams satisfies the above condition.

In the optical modulation elements 104, 304, 404, and 504, the signal electrodes 250a, 252a, 250b, and 252b are formed to extend to another side (for example, the short side 260a) different from the one side (for example, the long side 260c) of the substrate 230 along the direction in which the two nested Mach-Zehnder type optical waveguides 240a, 240b extend.

According to this configuration, the high-frequency electrical signals that are input from the other side (short side 260a) can be linearly guided to the positions of the two nested Mach-Zehnder type optical waveguides 240a and 240b via the signal electrodes 250a, 252a, 250b and 252b along the extending direction of the two nested Mach-Zehnder type optical waveguides 240a and 240b. Therefore, the optical modulation elements 104, 304, 404, and 504 can realize favorable high-frequency characteristics.

In the optical modulation elements 104, 304, 404, and 504, the two nested Mach-Zehnder type optical waveguides 240a and 240b respectively include the different Mach-Zehnder type optical waveguides 244a and 246a, and 244b and 246b in two parallel waveguides respectively configuring the nested Mach-Zehnder type optical waveguides 240a and 240b.

According to this configuration, a DP-QPSK modulator can be compactly configured on the substrate 230.

In the optical modulation elements 104 and 304, the two connection waveguides 270a and 270b are both formed of a linear waveguide and a curved waveguide, and are configured such that total propagation losses from the light input portion of the branched waveguide 234 to the respective modulation light input ends 242a and 242b of the two nested Mach-Zehnder type optical waveguides 240a and 240b are the same as each other.

According to this configuration, the propagation loss or the bending loss of each of the linear waveguides and the curved waveguides configuring the connection waveguides 270a and 270b can be adjusted such that the amounts of light input to the two nested Mach-Zehnder type optical waveguides 240a and 240b are the same as each other, and thus the degree of freedom in design is improved.

In the optical modulation element 504, the two connection waveguides 470a and 270b are configured such that respective optical path lengths from the light input portion of the branched waveguide 234 to the modulation light input ends 242a and 242b of the two nested Mach-Zehnder type optical waveguides 240a and 240b are the same as each other.

According to this configuration, phases of light input to the two nested Mach-Zehnder type optical waveguides 240a and 240b can be accurately matched.

In the optical modulation elements 104, 304, 404, and 504, the substrate 230 is formed in a rectangular shape having the two opposing short sides 260a and 260b and the two opposing long sides 260c and 260d longer than the short sides 260a and 260b. The one side is either of the long sides 260c and 260d, and the propagation direction of light when being input to the branched waveguide 234 is a direction along the short sides 260a and 260b.

According to this configuration, for example, in the rectangular substrate 230, high-frequency electrical signals are input from the ends of the signal electrodes 250a, 250b, 252a, and 252b extending along the long side 260c and reaching the short side 260a, and thus a position where light from the outside is input to the substrate 230 can be disposed at sides (for example, the long side 260c or the short side 260b) other than the short side 260a. Consequently, it is possible to easily realize a configuration in which the signal electrodes 250a, 250b, 252a, and 252b linearly extend to the two nested Mach-Zehnder type optical waveguides 240a and 240b while avoiding conflicts between an input position of a high-frequency electrical signal and a light input position.

The optical modulation module 100 described in the above embodiment includes an optical modulation element that is one of the optical modulation elements 104, 304, 404, and 504, the electronic circuit 106 driving the optical modulation element, and the housing 102 that houses the optical modulation element and the electronic circuit 106.

According to this configuration, the optical modulation module 100 having favorable high-frequency characteristics and optical modulation characteristics can be compactly configured.

REFERENCE SIGNS LIST

100 Optical modulation module
102 Housing
104, 304, 404, 504, 600, 700, 800 Optical modulation element
106 Electronic circuit
108 Feed-through portion
110a, 110b, 110c, 110d Signal pin
112a, 112b terminator
114 Input optical fiber
116 Optical unit
118 Lens
120 Output optical fiber
122, 124 Support
230, 530 Substrate
232, 332, 532, 632, 732 Input waveguide
234, 534 Branched waveguide
240a, 240b, 540a, 540b Nested Mach-Zehnder type optical waveguide
242a, 242b, 542a, 542b Modulation light input end 244a, 244b, 246a, 246b, 544a, 544b, 546a, 546b Mach-Zehnder type optical waveguide
248a, 248b, 548a, 548b Output waveguide
250a, 250b, 252a, 252b, 550a, 550b, 552a, 552b, 650a, 650b,
652a, 652b, 750a, 750b, 752a, 752b Signal electrodes
254a, 254b, 554a, 554b End arrangement
256a, 256b, 258a, 258b, 556a, 556b, 558a, 558b Bias electrode
260a, 260b Short side
260c, 260d Long side
270a, 270b, 470a Connection waveguide
472 Meandering portion
734 MMI coupler
280a, 280b Branch point.

The invention claimed is:

1. An optical modulation element comprising:
    two Mach-Zehnder type optical waveguides that are provided on a substrate;
    a branched waveguide that branches input light which is input from an outside of the substrate into two light beams;
    two connection waveguides that respectively guide the light beams branched by the branched waveguide to the two Mach-Zehnder type optical waveguides; and
    electrodes that respectively control optical waves propagating in optical waveguides configuring the two Mach-Zehnder type optical waveguides, wherein
    respective parallel waveguides of the two Mach-Zehnder type optical waveguides are configured to extend linearly along one side of the substrate,
    the branched waveguide is a Y-branch optical waveguide disposed such that light is input from a direction of the one side of the substrate,
    the branched waveguide is formed to be line-symmetrical with respect to a propagation direction of the light input to the branched waveguide and to output the two branched light beams in a direction different from the propagation direction,
    the two connection waveguides each includes a linear waveguide and a curved waveguide, and
    the linear waveguides each included in the connection waveguides extend in a direction different from the direction of extension of the parallel waveguides.

2. The optical modulation element according to claim 1, wherein
    the branched waveguide is formed such that a spacing between the two branched output light beams when exiting a line-symmetrically formed portion is smaller than a spacing between respective light input ends of the two Mach-Zehnder type optical waveguides.

3. The optical modulation element according to claim 1, wherein
    each of the electrodes is formed to extend to an other side of the substrate different from the one side, along a direction in which the two Mach-Zehnder type optical waveguides extend.

4. The optical modulation element according to claim 1, wherein
    the two Mach-Zehnder type optical waveguides are nested Mach-Zehnder type optical waveguides each of which include other Mach-Zehnder type optical waveguides in two parallel waveguides respectively configuring the Mach-Zehnder type optical waveguides.

5. The optical modulation element according to claim 1, wherein
    the two connection waveguides are configured such that total propagation losses from a light input portion of the branched waveguide to respective light input ends of the two Mach-Zehnder type optical waveguides are the same as each other.

6. The optical modulation element according to claim 1, wherein
    the two connection waveguides are configured such that optical path lengths from a light input portion of the branched waveguide to respective light input ends of the two Mach-Zehnder type optical waveguides are the same as each other.

7. The optical modulation element according to claim 1, wherein
    the substrate has a rectangular shape having two opposing short sides and two opposing long sides longer than the short sides,
    the one side is one of the long sides, and
    the propagation direction of the light when the light is input to the branched waveguide is a direction along the short sides.

8. An optical modulation module comprising:
    the optical modulation element according to claim 1;
    an electronic circuit that drives the optical modulation element; and
    a housing that houses the optical modulation element and the electronic circuit.

* * * * *